United States Patent
Vandergrift (10) Patent No.: US 10,027,267 B2
(45) Date of Patent: Jul. 17, 2018

(54) EXCITER DRIVE CIRCUIT INCLUDING CONFIGURABLE FLYBACK UNIT WITH FAST ENERGY FIELD COLLAPSE

(71) Applicant: Hamilton Sundstrand Corporation, Charlotte, NC (US)

(72) Inventor: Adrian E. Vandergrift, Rockton, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 50 days.

(21) Appl. No.: 15/209,247

(22) Filed: Jul. 13, 2016

(65) Prior Publication Data
US 2018/0019691 A1    Jan. 18, 2018

(51) Int. Cl.
*H02P 9/14* (2006.01)
*H02P 9/10* (2006.01)

(52) U.S. Cl.
CPC ............ *H02P 9/14* (2013.01); *H02P 9/102* (2013.01)

(58) Field of Classification Search
CPC .................. H02P 9/14; H02P 9/102
See application file for complete search history.

(56) References Cited

U.S. PATENT DOCUMENTS

| | | | |
|---|---|---|---|
| 5,038,094 A | 8/1991 | Rashid | |
| 5,087,869 A | 2/1992 | Kuriyama | |
| 5,194,801 A | 3/1993 | Rozman | |
| 7,633,259 B2 * | 12/2009 | Fish | H02P 9/102 318/701 |
| 7,944,183 B2 | 5/2011 | Nishimura | |
| 8,058,851 B2 | 11/2011 | Petkov | |
| 8,289,005 B2 * | 10/2012 | Bekiarov | H02J 7/1438 322/25 |
| 8,305,049 B2 | 11/2012 | Maddali et al. | |
| 8,450,892 B2 | 5/2013 | Patel et al. | |
| 8,970,183 B2 | 3/2015 | Maddali et al. | |
| 2005/0146309 A1 * | 7/2005 | Chen | H02J 7/16 322/28 |
| 2005/0151515 A1 * | 7/2005 | Isurin | H02P 9/305 322/28 |
| 2008/0164852 A1 * | 7/2008 | Taniguchi | H02P 9/006 322/25 |

(Continued)

FOREIGN PATENT DOCUMENTS

| | | |
|---|---|---|
| CN | 2082914 U | 8/1991 |
| JP | 2002070897 A | 3/2002 |
| JP | 2006345585 A | 12/2006 |

OTHER PUBLICATIONS

European Search Report for EP 17181143.3; dated Dec. 19, 2017; 5 pages.

*Primary Examiner* — Viet Nguyen
(74) *Attorney, Agent, or Firm* — Cantor Colburn LLP (57) ABSTRACT

A power system includes an integrated drive generator (IDG) including an exciter field winding. A generator control unit (GCU) includes exciter drive circuit configured to electrically energize the exciter field winding, and a main stator configured to output voltage to at least one electrical load. The exciter drive circuit includes a dynamic flyback unit configured to selectively operate the exciter drive circuit between a first mode and a second mode different from the first mode based on a change in the at least one electrical load.

11 Claims, 6 Drawing Sheets

From POR (56) References Cited

U.S. PATENT DOCUMENTS

| | | | |
|---|---|---|---|
| 2009/0189554 A1* | 7/2009 | Alex | H02P 9/02 |
| | | | 318/400.04 |
| 2010/0007312 A1* | 1/2010 | Petkov | H02P 9/02 |
| | | | 322/44 |
| 2010/0079117 A1* | 4/2010 | Bekiarov | H02J 7/1438 |
| | | | 322/28 |
| 2013/0128394 A1 | 5/2013 | Spannhake | |
| 2013/0182354 A1 | 7/2013 | Maddali et al. | |

* cited by examiner

EXCITER DRIVE CIRCUIT INCLUDING CONFIGURABLE FLYBACK UNIT WITH FAST ENERGY FIELD COLLAPSE

TECHNICAL FIELD

The present invention relates generally to aircraft integrated drive generators (IDGs), and more particularly, to an exciter drive circuit for driving an aircraft IDG.

BACKGROUND

Integrated Drive Generators (IDGs) supply constant frequency alternating current (AC) electrical power to an aircraft. The IDG utilizes the constant speed drive as a highly reliable continuously variable transmission to convert a variable input speed provided by an aircraft's engine into a constant output speed for the IDG's integral AC generator. This integration of drive and generator provides a solution for delivering constant frequency electrical power to the aircraft.

Figure 1:
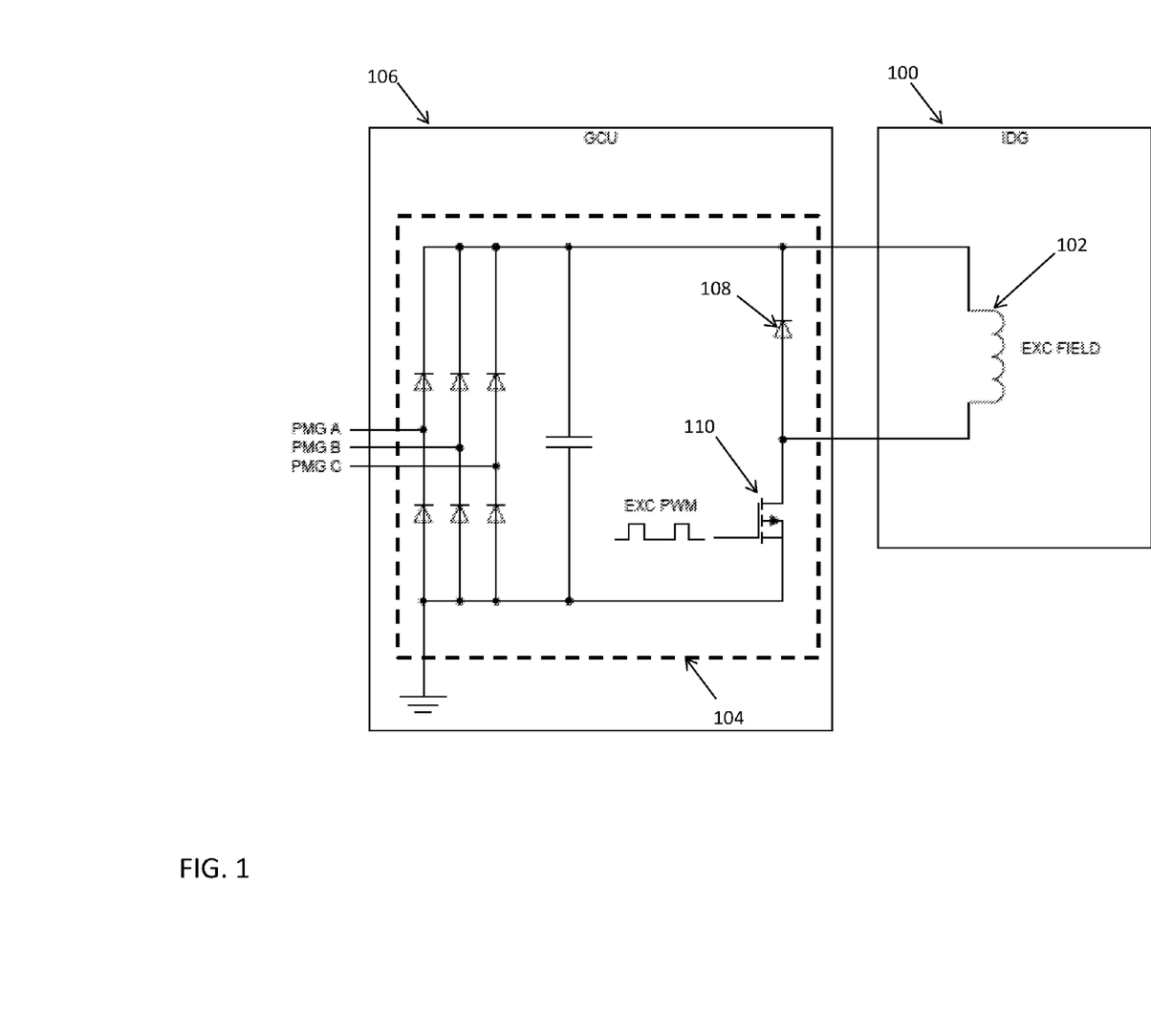
FIG. 1 is a diagram of a conventional single switch exciter drive circuit for driving an exciter field winding included in an IDG.
Figure 2:
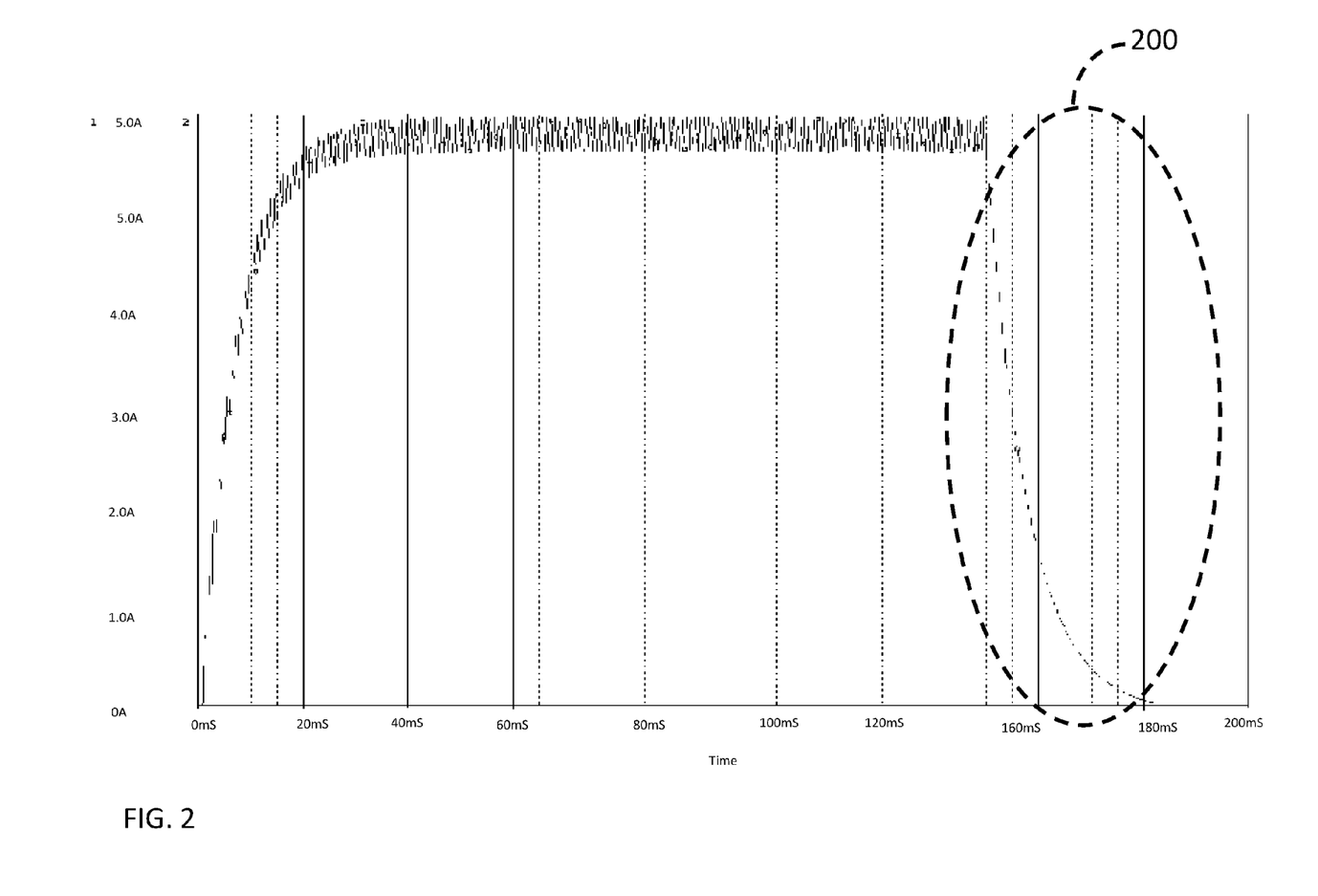
FIG. 2 is a signal diagram illustrating the exciter field current decay resulting from a conventional single switch exciter drive implementing a single flyback diode.

Referring to FIG. 1, traditional IDGs 100 implement an exciter field winding 102 that is electrically energized by an exciter drive circuit 104 included in a generator control unit (GCU) 106. The conventional exciter drive circuit 104 typically includes a single semiconductor switch 110 implemented with a single flyback diode 108 to assist in dissipating energy flyback (e.g., voltage flyback) when the load (not shown) coupled to the IDG 100 is suddenly reduced or removed. A typical single switch exciter drive circuit as shown in FIG. 1, however, experiences gradual decay times when attempting to remove energy from the exciter field 102 during transient events caused by load disconnects, load reductions, and/or recovery from load faults, for example (see FIG. 2). As a result, the IDG 100 can experience a significant voltage overshoot if the exciter drive is unable to remove energy quickly enough from the exciter field after the IDG's load has been stepped from a heavy load to a very light load.

SUMMARY

According to a non-limiting embodiment, a power system includes an integrated drive generator (IDG) including an exciter field winding. A generator control unit (GCU) includes exciter drive circuit configured to electrically energize the exciter field winding, and a main stator configured to output voltage to at least one electrical load. The exciter drive circuit includes a dynamic flyback unit configured to selectively operate the exciter drive circuit between a first mode and a second mode different from the first mode based on a change in the at least one electrical load.

According to another non-limiting embodiment, a method of removing stored energy from an exciter field winding included in in an integrated drive generator (IDG) comprises electrically energizing the exciter field winding, and generating an electric field in response to energizing the exciter field winding. Based on the electric field, output voltage is generated that is delivered to at least one electrical load. The method further includes detecting whether a transient event exists based on a change in the at least one load. The method further includes selectively operating the exciter drive circuit between a first mode and a second mode different from the first mode based on a change in the at least one electrical load. The second load increases the reverse voltage of the exciter field winding so as to reduce a decay time at which energy is removed from the exciter field winding.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

At least one non-limiting embodiment described herein provides an exciter drive circuit including a configurable flyback unit as opposed to a single non-configurable flyback diode. In at least one embodiment, the configurable element is implemented as a transient voltage suppression (TVS) device connected in series with a switching device. Unlike conventional single switch exciter drive circuits which have a slow energy decay time, the configurable element is capable of collapsing energy flyback to achieve substantial increases in decay time based on the L/R time constant formed by the exciter's inductance and the total resistance in the exciter and the exciter drive feeders. When configured as a high voltage TVS in series with a single diode, the energy in the field collapses much more quickly. Accordingly, IDG voltage overshoot is substantially reduced.

Figure 3A:
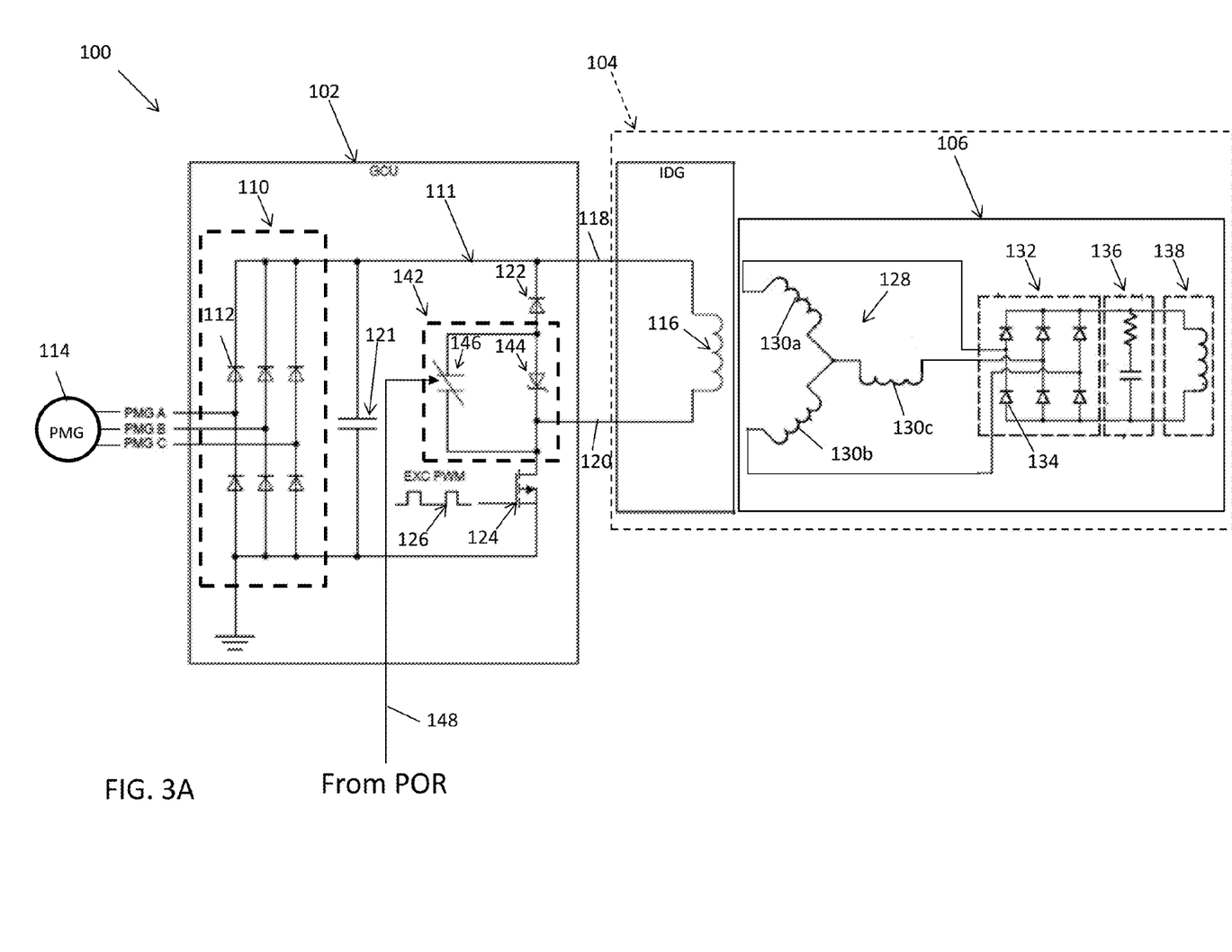
FIGS. 3A-3B is a diagram of an exciter drive circuit including a configurable flyback unit providing a reduced energy field decay time according to a non-limiting embodiment.
Figure 3B:
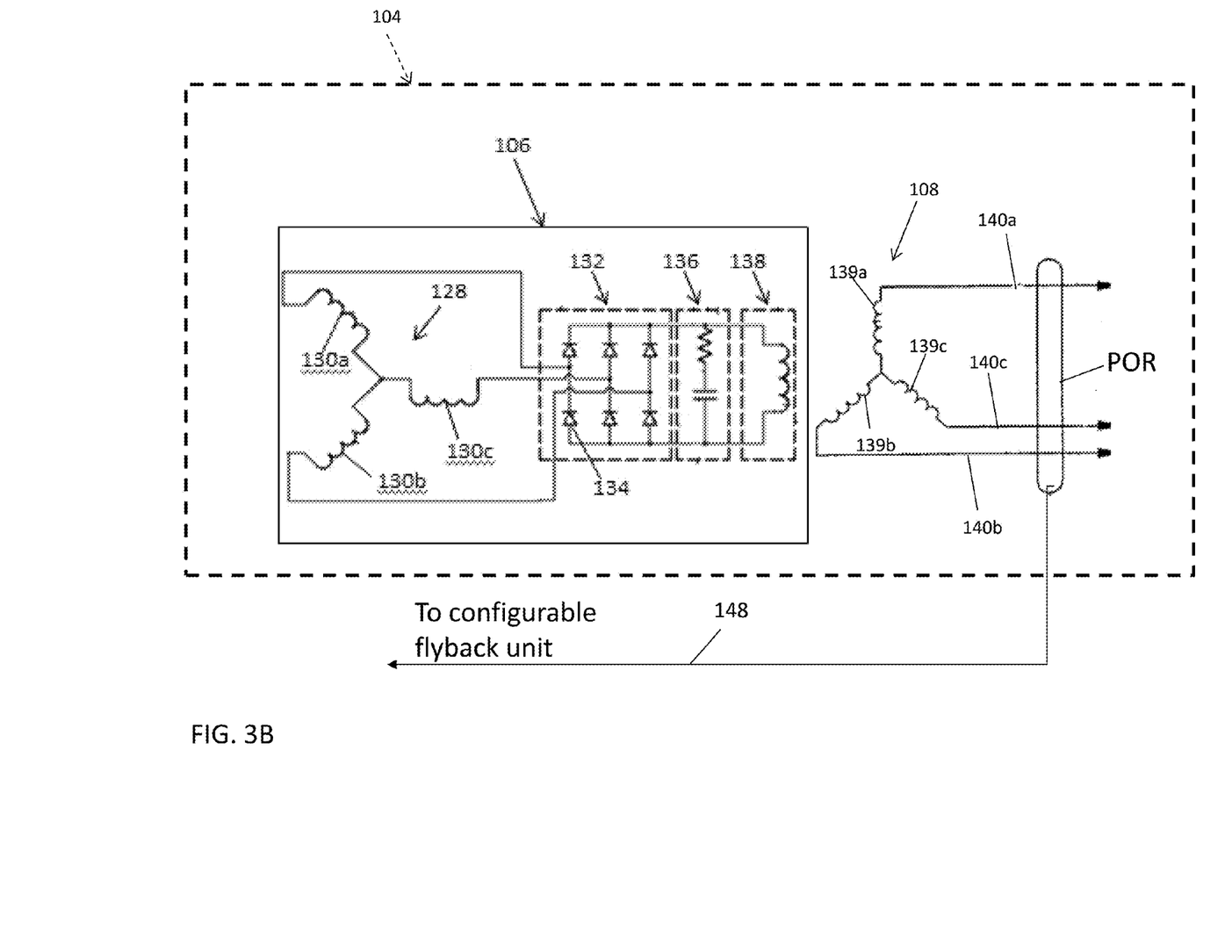

Turning now to FIGS. 3A-3B, a power system 100 including a configurable flyback exciter drive circuit that reduces energy field decay time is illustrated according to a non-limiting embodiment. The power system 100 includes a GCU 102, an IDG 104, a rotating generator 106, and a main stator 108.

The GCU 102 comprises a rectifier circuit 110 and an exciter drive circuit 111. The rectifier circuit 110 may be constructed, for example, as a full wave bridge rectifier 110 comprising a plurality of diodes 112 that rectifies a polyphase alternating current (AC) voltage ($PMG_A$, $PMG_B$, $PMG_C$) generated by a permanent magnet generator (PMG) 114.

The output of the full-wave bridge rectifier 110 is delivered to the exciter drive circuit 111 which drives an exciter field winding 116 via lines 118 and 120. A filter element 121 such as a capacitor, for example, may be placed across the output of the full-wave bridge rectifier 110 to create a DC voltage source for the exciter drive circuit 111, and an exciter field fly-back diode 122 is provided across lines 120 and 118 to provide a current path as the field current decays once an exciter field control switch 124 is turned off. When the exciter field control switch 124 is commanded on via a pulse-width modulated (PWM) drive signal 126, current flows through the exciter field winding 116 included with the IDG 104, which in turn induces an electric field.

According to a non-limiting embodiment, the rotating portion of the generator 106 incorporates an exciter armature rotor 128 having one or more armature windings. For example, three armature windings 130a-130c are associated with the armature rotor 128 so as to generate three phase power as the armature rotor 128 is rotated adjacent the exciter field winding 116 and is energized by the corresponding magnetic field. The voltage generated by the armature rotor 128 passes downstream to a rotating rectifier 132 such as, for example, a diode bridge 132 including a plurality of diodes 134. The rotating rectifier 132 converts the generated AC voltage into a DC voltage which passes downstream to a snubber circuit 136 connected in parallel with a main field winding 138. Accordingly, the main field winding 138 is provided with DC voltage from the rectifier 132. The resulting rotating field induces an AC voltage in the poly-phase windings 139a-139c of the main stator 108, which is then coupled to various electrical loads (not shown) via feeders 140a, 140b, 140c, which may act as a point of regulation (POR) (see FIG. 3B). The output voltage and the current supplied to the loads may be monitored by a voltage regulator (not shown) or hardware controller (not shown) which then adjusts the pulse width modulation signal 126 (e.g., the frequency) applied to the switch 124 so as to maintain the output voltage at a given level.

As further illustrated in FIG. 3A, the exciter drive circuit 111 includes a configurable flyback unit 142 that substantially reduces the energy field decay time in the event one or more loads are abruptly disconnected and/or significantly reduced. The configurable flyback unit 142 includes a transient voltage suppression (TVS) device 144 connected in parallel with a flyback switch 146. According to an embodiment, the anode of the TVS device 114 is connected to both the a first terminal of the flyback switch 146 and an anode of the flyback diode 122, while the cathode is connected to both the delivery line 120 of the exciter field winding 116 and the exciter field control switch 124. The TVS device 144 may include, but is not limited to, a TVS diode, a thyristor, a Zener diode, and a metal oxide varistor (MOV). The flyback switch 146 includes, but is not limited to, a semiconductor switch, and/or a mechanical relay switch.

Figure 4:
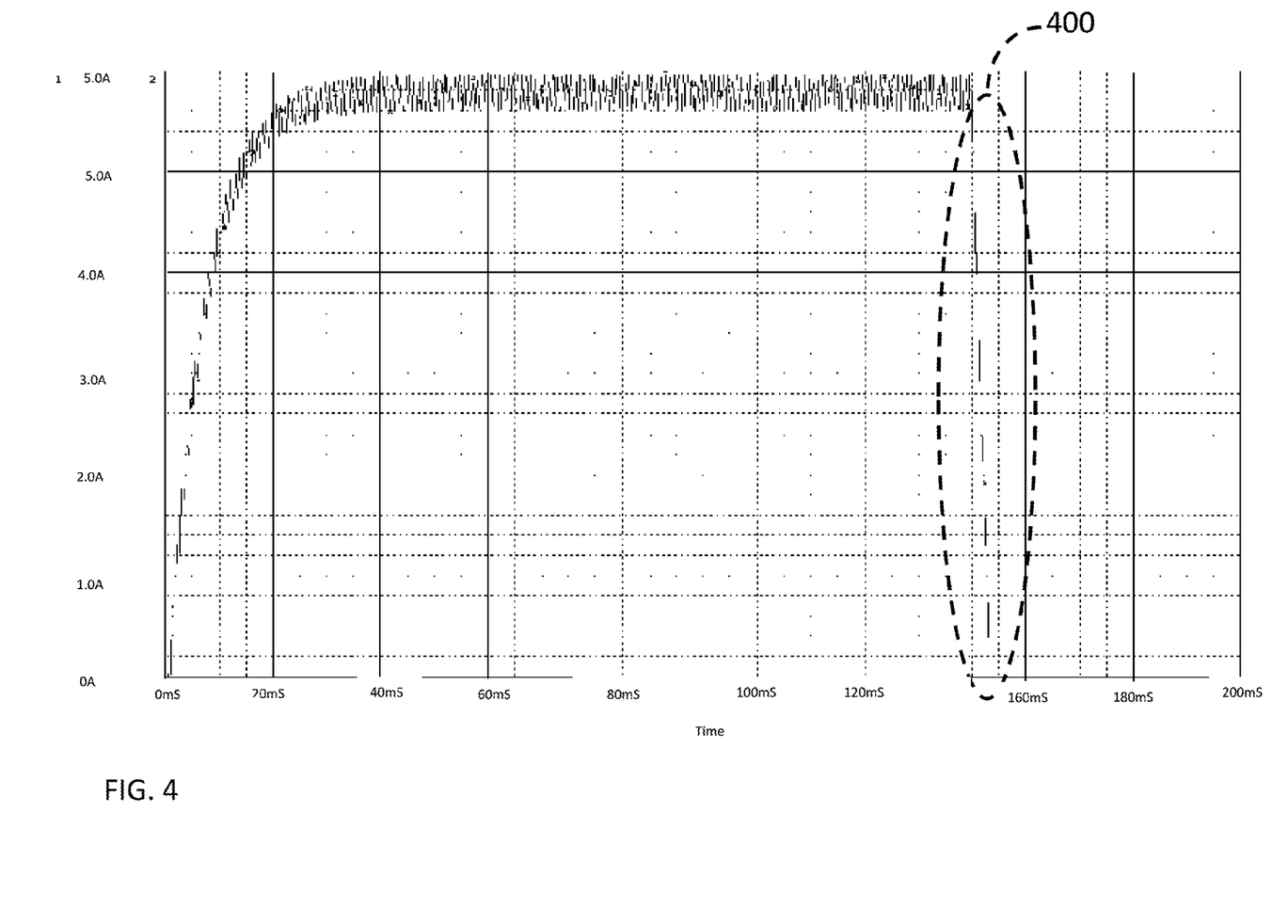
FIG. 4 is a signal diagram illustrating an exciter energy field collapse achieved by the exciter drive circuit including the configurable flyback unit shown in FIGS. 3A-3B according to a non-limiting embodiment.

The configurable flyback unit 142 allows the exciter drive circuit 111 to operate in two different modes depending on whether a transient event (e.g., abruptly disconnected load) exists. When operating in a first mode (e.g., normal mode), the flyback switch 146 is closed such that the TVS device 144 is by-passed (i.e., effectively shorted). When, however, a transient event occurs (e.g., a load is abruptly disconnected), the flyback unit 142 transitions the exciter drive circuit 111 into a second mode (e.g., transient mode) in response to opening the flyback switch 146. Accordingly, the TVS device 144 is initiated (i.e., effectively connected) and the reverse voltage across the exciter field winding 116 increases. In response to initiating the transient mode of the exciter drive circuit 111, the energy stored in the exciter field winding 116 collapses quickly. In this manner, the decay time 400 for removing the energy from the exciter field winding 116 is significantly decreased (see FIG. 4) compared to the decay time 200 of a conventional single switch exciter drive circuit that implements a static flyback diode (see FIG. 2).

According to a non-limiting embodiment, a controller (not shown) has an input connected to the POR and an output connected to the flyback switch 146. In this manner, controller can monitor the voltage level at the POR, and continuously compare the POR voltage to a threshold value. When the POR voltage exceeds the threshold value, the controller can output a signal (e.g. feedback signal 148) to open the flyback switch 146 and initiate the transient mode of the exciter drive circuit 111. In this manner, the exciter drive circuit 111 operates as a configurable or dynamic flyback element as opposed to a single static flyback diode as provided by conventional single switch exciter drive circuits.

Figure 5:
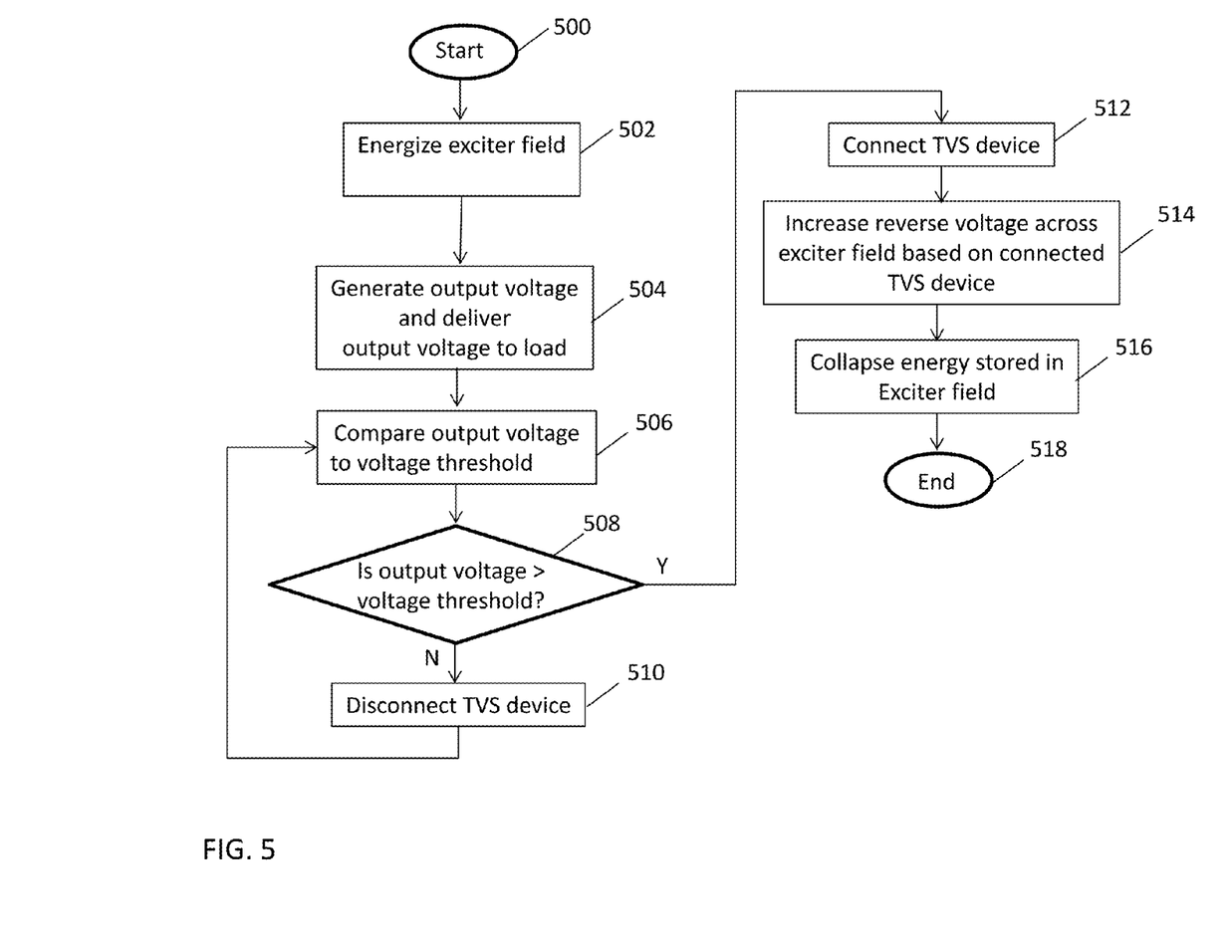
FIG. 5 is a flow diagram illustrating a method of removing energy stored in an exciter field winding of an IDG according to a non-limiting embodiment.

Turning now to FIG. 5, a flow diagram illustrates a method of removing energy stored in an exciter field winding of an IDG according to a non-limiting embodiment. The method begins at operation 500, and at operation 502 an exciter field winding is energized. At operation 504, an output voltage is generated by a main stator based on the excitation of the exciter field, and the output voltage is delivered to one or more loads connected to the main stator. At operation 506, the output voltage is compared to a voltage threshold. When the output voltage does not exceed the voltage threshold at operation 508, the TVS device is disconnected. According to a non-limiting embodiment, the TVS device may be selectively connected or disconnected based on operation of a flyback switch included in a dynamically operable flyback unit that is connected in parallel with the exciter field winding.

When, however, the output voltage exceeds the threshold voltage at operation 508, the TVS device is connected at operation 512. At operation 514, the reverse voltage across the exciter field winding is increased in response to connecting the TVS device, and the energy stored in the exciter field winding rapidly collapses at operation 516, as opposed to gradually being removed as is found in conventional single switch exciter drive circuits which implement only a single static flyback diode. The method then ends at operation 518.

As described in detail above, various non-limiting embodiments provide a configurable exciter drive circuit that dynamically operates in different modes based on whether a transient event exists. In at least one embodiment, the configurable exciter drive circuit includes a flyback switch that selectively initiates a TVS element. When a transient event is detected, the flyback switch is controlled to initiate the TVS element thereby increasing the reverse voltage across the exciter field winding. In this manner, the energy stored in the exciter field winding is collapsed such that the decay time for removing the energy from the exciter field winding is significantly decreased.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A power system, comprising:
an integrated drive generator (IDG) including an exciter field winding;
a generator control unit (GCU) including an exciter drive circuit configured to electrically energize the exciter field winding;
an exciter field fly-back diode including a first cathode connected to the exciter field winding and a first anode connected to a dynamic flyback unit included with the exciter drive circuit;
a main stator configured to output voltage to at least one electrical load;
wherein the dynamic flyback unit is configured to selectively operate the exciter drive circuit between a first mode and a second mode different from the first mode based on a change in the at least one electrical load, the dynamic flyback unit comprising:
a transient voltage suppression (TVS) device including a second cathode connected to the exciter field winding, and a second anode connected to the first anode; and
a flyback switch connected in parallel with the TVS device,
wherein the dynamic flyback unit is connected to the exciter field winding and is configured to initiate the TVS device in response to an occurrence of the transient event thereby increasing the reverse voltage across the exciter field winding.

2. The power system of claim 1, wherein flyback switch operates in an closed state when no transient event exists so to bypass the TVS device, and operates in a open state when a transient event exists so as to connect the TVS device.

3. The power system of claim 2, wherein the TVS device is one of a TVS diode, a thyristor, a Zener diode, or a metal oxide varistor (MOV).

4. The power system of claim 3, wherein the flyback switch is one of a mechanical relay or a semiconductor switch.

5. The power system of claim 2, wherein a determination on an existence of the transient event is based on a comparison between a point of regulation located at the output of the main stator and a threshold value.

6. The power system of claim 5, wherein the transient event is detected when a voltage indicated by the point of regulation exceeds the threshold value.

7. A method of removing stored energy from an exciter field winding included in in an integrated drive generator (IDG), the method comprising:
electrically energizing an exciter field winding connected in parallel with a combination of an exciter field fly-back diode and a transient voltage suppression (TVS) device, a first cathode of the exciter field fly-back diode connected to a first terminal of the exciter field winding and a second cathode of the TVS device connected to an opposing terminal of the exciter field winding, wherein a first anode of the exciter field fly-back diode is connected to a second anode of the TVS device;
generating an electric field in response to energizing the exciter field winding and, based on the electric field, and generating an output voltage that is delivered to at least one electrical load;
detecting whether a transient event exists based on a change in the at least one load; and
selectively operating an exciter drive circuit between a first mode and a second mode different from the first mode based on a change in the at least one electrical load,
wherein selectively operating the exciter drive circuit in the second mode comprises: operating a flyback switch in an open state, the flyback switch connected in parallel with the TVS device so as to initiate the TVS device in response to the transient event; and in response to initiating the TVS device, increasing the reverse voltage of the exciter field winding so as to reduce a decay time at which energy is removed from the exciter field winding.

8. The method of claim 7, further comprising operating the flyback switch in a closed state when no transient event exists so to bypass the TVS device.

9. The method of claim 8, wherein the TVS device is one of a TVS diode, a thyristor, a Zener diode, or a metal oxide varistor (MOV).

10. The method of claim 9, wherein the flyback switch is one of a mechanical relay or a semiconductor switch.

11. The method of claim 8, further comprising detecting the transient even when the output voltage exceeds a threshold value.

* * * * *